(12) United States Patent
Hergenrother et al.

(10) Patent No.: US 8,329,297 B2
(45) Date of Patent: Dec. 11, 2012

(54) RUBBER COMPOSITIONS CONTAINING NON-SULFUR SILICA COUPLING AGENTS BOUND TO DIENE RUBBERS

(75) Inventors: William L. Hergenrother, Akron, OH (US); Chenchy Jeffrey Lin, Hudson, OH (US); Yaohong Chen, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 424 days.

(21) Appl. No.: 12/628,527

(22) Filed: Dec. 1, 2009

(65) Prior Publication Data

US 2010/0132868 A1 Jun. 3, 2010

Related U.S. Application Data

(60) Provisional application No. 61/118,781, filed on Dec. 1, 2008.

(51) Int. Cl.
*B32B 5/16* (2006.01)
*B60C 5/00* (2006.01)
*C08G 18/08* (2006.01)
*C08G 73/10* (2006.01)

(52) U.S. Cl. ......... 428/405; 152/450; 524/714; 524/847

(58) Field of Classification Search ............... 428/405; 152/450; 524/714, 847
See application file for complete search history.

(56) References Cited

U.S. PATENT DOCUMENTS

| | | | |
|---|---|---|---|
| 6,342,552 B1 * | 1/2002 | Hergenrother et al. | 524/264 |
| 6,433,065 B1 * | 8/2002 | Lin et al. | 524/492 |
| 6,878,768 B2 | 4/2005 | Tardivat et al. | |
| 7,238,740 B2 | 7/2007 | Belin et al. | |
| 2003/0181562 A1 * | 9/2003 | Belin et al. | 524/430 |
| 2003/0191225 A1 * | 10/2003 | Tardivat et al. | 524/492 |
| 2006/0084730 A1 * | 4/2006 | Fukushima et al. | 524/90 |

* cited by examiner

*Primary Examiner* — William Cheung
(74) *Attorney, Agent, or Firm* — Meredith Hooker; Nathan T. Lewis

(57) ABSTRACT

The invention provides vulcanizable rubber compound having improved tensile mechanical and dynamic viscoelastic properties. The compounds are formed by mixing an elastomer, containing unsaturated carbon-carbon bonds in its molecular structure, with a reinforcing inorganic filler silica in the presence of an alkyl alkoxysilane and a non-sulfur coupling agent that binds to the rubber backbone with an "ene" linkage or a 1,3 dipolar addition linkage. In particular, the coupling agent and the alkyl alkoxysilane are present in the compound in a weight ratio of about 0.0001:1 to about 1:1.

21 Claims, No Drawings

RUBBER COMPOSITIONS CONTAINING NON-SULFUR SILICA COUPLING AGENTS BOUND TO DIENE RUBBERS

This Application claims priority to U.S. Provisional Application Ser. No. 61/118,781 filed Dec. 1, 2008.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires.

Dispersion of silica filler has been a major concern in tire processing because polar silanol groups on the surface of silica particles tend to self-associate and reagglomeration of silica particles can occur after compounding, leading to poor silica dispersion and a high compound viscosity. The strong silica filler network results in a rigid uncured compound that is difficult to process in extrusion and forming operations. Various silica coupling agents and silica shielding agents have been employed to address these problems. For example, bifunctional silica coupling agents having a moiety (e.g., a silyl group) reactive with the silica surface and a moiety (e.g., sulfur) that binds to the elastomer are well known and include mercaptosilanes, blocked mercaptosilanes, bis(trialkoxysilylorgano) polysulfides, and the like. These commonly-used sulfur-containing bifunctional silica coupling agents can offer excellent coupling between rubber and silica; however, there are disadvantages to their use. For example, the high chemical reactivity of the —SH functions of the mercaptosilanes (e.g., γ-mercaptoalkyltrialkoxysilanes, 3-thiocyanatopropyl trimethoxysilane, and the like) with organic polymers can lead to unacceptably high viscosities during processing and to premature curing (scorch), making compounding and processing more difficult. Rubber compounds employing bis(trialkoxysilylorgano) polysulfides often have mixing temperature limitations to avoid thermal degradation of the agents and premature increase in the viscosity of the rubber mixture. In general, when compared with carbon black-filled compositions, a silica coupling agent is needed to obtain tread compounds having good silica dispersion.

Several approaches to improving dispersion of silica in rubber compounds have been directed to reducing or replacing the use of such sulfur-containing silica coupling agents by employing silica dispersing aids, such as silica shielding agents that chemically react with, and/or physically shield the surface silanol groups on the silica particles but are not reactive with the elastomer. Although these agents can improve processability of the compound, in some cases they may not provide adequate physical properties to the rubber compound when used alone because they do not chemically bind to the rubber backbone.

Recently, non-sulfur alkoxysilane coupling agents, such as citraconimido-alkoxysilane coupling agents, have been described in U.S. Pat. Nos. 6,878,768 and 7,238,740. However, a major problem with using these silica/rubber coupling agents is that they are only effective when combined with an isoprene elastomer, and are ineffective in the absence of such an elastomer. That is, when the diene elastomer consists essentially of another synthetic elastomer such as styrene-butadiene rubber (SBR), conventionally used in treads for tires, the excessive reactivity, increase in viscosity and insufficient coupling performance, are still a major problem. Moreover, it was disclosed that, despite a similar chemistry, a similar maleimido-triethoxysilane coupling agent produced a greatly increased viscosity in the uncured isoprene rubber compared with the citraconimido-trialkoxysilane coupling agent.

Therefore, there is a need for rubber compositions that do not have the above-described limitations, regardless of the diene rubber employed, that can make use of non-sulfur silica coupling agents that can bond to the rubber backbone.

SUMMARY OF THE INVENTION

In all arrangements of the invention rubber compositions, unless otherwise indicated, the term "silica" as used herein as a reinforcing filler, is intended to include other known inorganic reinforcing fillers for rubber such as, but not limited to, clay (hydrous aluminum silicate), talc (hydrous magnesium silicate), kaolin, clay, metal oxides, aluminum hydrate [Al(OH)$_3$], mica, and the like.

It was unexpectedly discovered that the detrimental effects of rapid diene rubber binding by non-sulfur eneophile alkoxysilane coupling agents such as, but not limited to, maleimide alkoxysilanes, citronimide alkoxysilanes, azo-bis-carbonyl alkoxysilanes, and the like, can be overcome by using very small amounts of these silica/rubber coupling agents in combination with an additional silica shielding agent that does not bind to the rubber. Moreover, it has unexpectedly been discovered that the detrimental effects of rapid diene rubber binding by other non-sulfur rubber binding alkoxysilane coupling agents such as, but not limited to, and alkoxysilane compounds that bind to the rubber by 1,3 dipolar addition such as nitrone alkoxysilanes, nitrile imine alkoxysilanes, nitrile oxide alkoxysilanes, and the like, similarly can be overcome by the inclusion in the rubber composition of the additional alkoxysilane silica shielding agent. That is, a very small amount of the eneophilic alkoxysilanes and those alkoxysilanes having groups that bind to the rubber by 1,3 dipolar addition and facilitate binding of silica by the polymer, in combination with a much larger amount of the silica shielding agent, provides a desirable compound viscosity for processability and results in cured rubber having reduced hysteresis and stress/strain properties.

An advantage of the arrangements of the invention is that the rubber compositions containing the appropriate weight ratio of the silica/rubber coupling agent and the silica shielding agent results in a vulcanizable and/or vulcanized elastomeric composition, containing virtually any olefin rubber or combination of olefin rubbers, that demonstrates tensile mechanical and dynamic viscoelastic properties that are improved over similar compounds prepared with the eneophile alkoxysilanes and/or the 1,3 dipolar addition alkoxysilane compounds alone. Further, the properties of the invention compounds exhibit improved dispersion of silica, reduced filler flocculation after compounding and increased bound rubber content, resulting in lower hysteresis and improved wear resistance in the vulcanized product, comparable to or improved over compounds containing a bis(trialkoxysilylorgano) polysulfide, and comparable properties to compounds prepared with a similar weight ratio of a mercaptosilane and an alkyl alkoxysilane.

In particular, a vulcanizable rubber composition comprises an elastomer containing unsaturated carbon-carbon bonds in its molecular structure; a reinforcing inorganic filler or a mixture thereof with carbon black; a coupling agent comprising an alkoxysilane moiety that binds to the inorganic filler and a non-sulfur moiety that reacts with the unsaturated carbon-carbon bonds of the elastomer to bind the coupling agent to the elastomer; an alkyl alkoxysilane, wherein the weight ratio of the coupling agent to the alkyl alkoxysilane is about 0.0001:1 to about 1:1; and a cure agent. As a non-limiting example, the silica/rubber coupling agent in the rubber composition can comprises an imidoalkoxysilane, an azo-bis-carbonyl-alkoxysilane, a nitrone alkoxysilane, a nitrileimine alkoxysilane, a nitrileoxide alkoxysilane, and mixtures of these. The elastomer is selected from the group consisting of homopolymers of a conjugated diene monomer, and copolymers and terpolymers of the conjugated diene monomers with monovinyl aromatic monomers and trienes and, especially copolymers and terpolymers of butadiene that comprise about 35% or greater butadiene content.

The invention further provides a vulcanized rubber compound comprising the vulcanizable rubber composition, and a pneumatic tire comprising a component produced from the vulcanized rubber compound.

DETAILED DESCRIPTION OF THE INVENTION

The terms elastomer, polymer and rubber are used interchangeably herein, as is customary in the rubber industry.

The invention presents a vulcanizable rubber composition that comprises an elastomer containing unsaturated carbon-carbon bonds in its molecular structure; a reinforcing inorganic filler, carbon black, or a mixture of the inorganic filler with carbon black; a coupling agent comprising an alkoxysilane moiety that binds to the inorganic filler and a non-sulfur moiety that reacts with the unsaturated carbon-carbon bonds of the elastomer to bind the coupling agent to the elastomer; an alkyl alkoxysilane, wherein the weight ratio of the coupling agent to the alkyl alkoxysilane is about 0.0001:1 to about 1:1; and a cure agent.

The non-sulfur moiety of the coupling agent can include, but is not limited to, an eneophile, a compound that forms a 1,3 dipolar addition linkage to the rubber and, in the vulcanizable rubber composition, can include mixtures of these.

The coupling agent can comprise, but is not limited to, unsaturated imidosilane compounds having the formula:

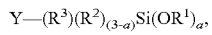

wherein $R^1$ is $C_1$ to $C_4$ alkyl; $R^2$ is $C_1$ to $C_{20}$ alkyl, $C_3$ to $C_{20}$ cycloalkyl, $C_6$ to $C_{20}$ aromatic or $C_5$ to $C_{20}$ heteroaromatic; $R^3$ is $C_1$ to $C_{20}$ alkylenyl, $C_3$ to $C_{20}$ cycloalkylenyl, $C_6$ to $C_{20}$ arylenyl, $C_5$ to $C_{20}$ heteroarylenyl, or $R^4$—CH=CH—$R^4$, where $R^4$ is a single bond or an $R^3$; a=1, 2 or 3; and Y is selected from the group consisting of (i) —N(C=O)$_2$N=N,
(ii) —N(C=O)$_2$CH=CR$^1$,
(iii) —NH(C=O)N=N(C=O)OR$^1$,
(iv) —(C=O)N=N(C=O)OR$^1$,
(v) —O(C=O)N=N(C=O)OR$^1$,
(vi) —C≡N$^+$→(O)$^-$—R$^2$,
(vii) —C≡N$^+$→N$^-$—R$^2$,
(viii) —C≡N$^+$→O$^-$, and mixtures thereof.

Examples of such coupling agent include, but are not limited to, imidoalkoxysilanes, azo-bis-carbonyl-alkoxysilanes, nitrone alkoxysilanes, nitrileimine alkoxysilanes, nitrileoxide alkoxysilanes, and the like. Combinations of any of these can be used in the rubber compositions according to the invention. In particular, such coupling agents can include trialkoxysilanes, dialkoxysilanes, monoalkoxysilanes, and the like.

In contrast to the restriction of using a citraconimido-alkoxysilane with an isoprene rubber, described in U.S. Pat. No. 7,238,740, each of the non-sulfur coupling agents in combination with an alkyl alkoxysilane silica shielding agent, according to the invention, can be used with any elastomer containing unsaturated carbon-carbon bonds in its molecular structure. For example, the following formulas illustrate chemistry for attachment of alkoxysilanes to rubber backbones using non-sulfur linkages.

I. ENE Chemistry

In the following formulas, R is equivalent to $R^1$, and R' is equivalent to $R^2$ above.

A. Maleimides

Structure 1 below is representative of a maleimide alkoxysilane silica/rubber coupling agent, namely N-(3-propyltriethoxysilyl) maleimide prepared by the reaction of maleic anhydride and 3-aminopropyl-triethoxysilane. Structure 2 below is representative of a citraconimide alkoxysilane silica/rubber coupling agent, namely N-(3-propyltriethoxysilyl) citraconimide prepared similarly from the reaction of citraconic anhydride and 3-aminopropyltriethoxysilane. The synthesis of both structures is described in U.S. Pat. Nos. 6,878,768 and 7,238,740 using a process for the synthesis of N-alkyl- and N-arylimide derivatives, as described in J. Organic Chemistry, Vol. 62, 2652-2654, 1997.

As described in the above patents, structure 2 was an effective coupling agent that bonded to isoprene containing rubbers but was poorly reactive with butadiene rubbers, such as SBR. In contrast, structure 1 gave an undesirable high compound $ML_4$ with isoprene containing rubbers. It is known that maleimides have a high chemical reactivity with diene rubbers, i.e., they react extremely quickly with the rubber, resulting in rubber compounds that, like those using mercaptosilane coupling agents, can lead to unacceptably high viscosities during processing and to premature curing (scorch), making compounding and processing more difficult.

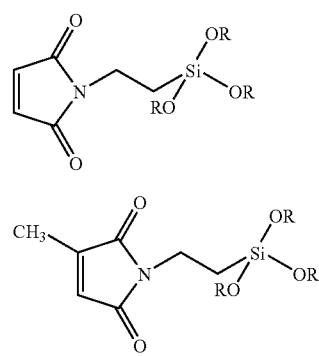

Without being bound by theory, an explanation of the reported reactivity can be understood from the mechanism of the of "ene" addition to the double bond of the isoprene rubber. This involves the allyl proton of the rubber being shifted to the eneophile in a concerted manner as illustrated in Scheme 1 below. Thus the rate of the reaction is controlled by the number of allyl hydrogens and the steric factor of the transition state.

Scheme 1

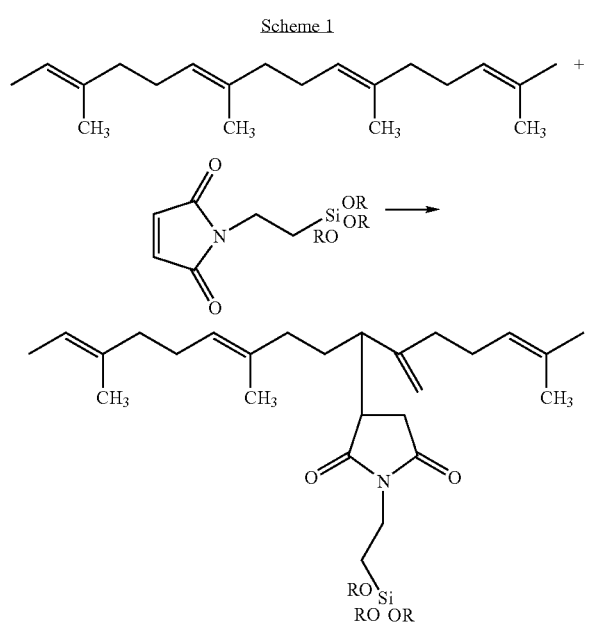

B. Azo-bis-carbonyls

Three different variations listed below as A, B and C, can be used to prepare an exemplary intermediate compound with the structure of

EtCO$_2$NHNHCO—Y—R—TS where Et is an ethyl group; the —Y— group represents a single bond, oxygen or nitrogen; R is derived from an acid chloride, a chlorocarbonate or an isocyanate; and TS represents a trialkoxysilane. As a non-limiting example, these attachments can be introduced to the azo-bis-carbonyl compound, ethyl carbazate, by reaction with a trialkoxysilane (such as those available from Gelest, Morrisville, Pa.) in, at most, one additional reaction step:

A) a phosgene reaction with N-(3-triethoxysilylpropyl)-4-hydroxybutyramide;

B) a thionyl chloride reaction with triethoxysilylpropyl maleamic acid; or

C) using 3-isocyantopropyl trimethoxysilane.

For example, some ethyl carbazate reactions with trialkoxysilanes are illustrated below in Examples 2A, 2B and 2C. However, the illustrated reactions are not limited, as other chemical reactions to attach alkoxysilanes to coupling agents, such as eneophiles and/or 1,3 dipolar addition coupling agents are known to those of ordinary skill in the art.

The intermediate product thus obtained can then be oxidized with N$_2$O$_4$ to give the "ene" reactive compounds where Y would be the desired single bond, oxygen or nitrogen suggested above. The reaction with any olefin rubber will give the following.

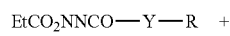
EtCO$_2$NNCO—Y—R +

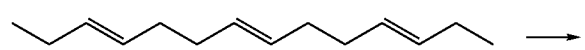

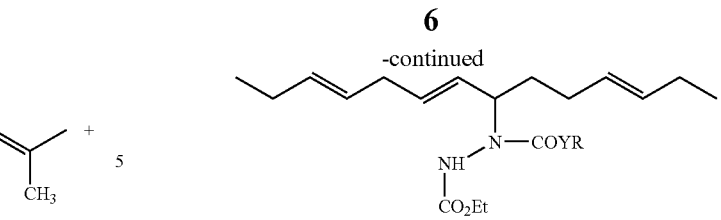

II. 1,3 Dipolar Addition

The use of a 1,3-dipolar addition reaction with the unsaturated rubber gives a good addition site for any trialkoxysilane containing molecule to which it is attached. The following represents the type of structure that can be used.

A. Nitrones

Nitrones are good dipolar addition reagents which have been used recently to attach a carbon black reactive functionality to an unsaturated rubber, as described in U.S. Pat. No. 7,186,845. They can be prepared with an aldehyde functionalized trialkoxysilane, such as triethoxysilyl butyraldehyde or triethoxysilyl undecanal, by a reaction with phenyl hydroxylamine, as illustrated in Scheme 2 below.

Scheme 2

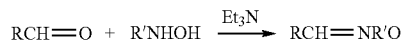
RCH=O + R'NHOH $\xrightarrow{Et_3N}$ RCH=NR'O

The reaction with rubber gives the structure of the attachment shown below.

RCH=NR'O +

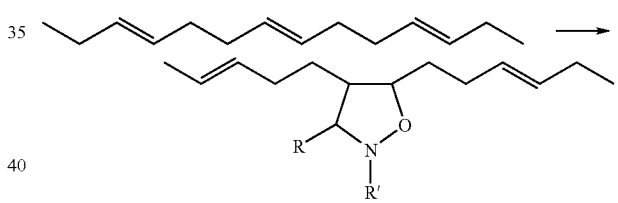

A trialkoxysilane can be introduced, for example, by employing an ethyl carbazate reaction with a trialkoxysilane, as described above and also in examples 2A, 2B and 2C below.

B. Nitrile Imines

Another useful unsaturated rubber reactive compound has a triethoxysilane attached to a nitrile imine. The nitrile imine can be formed by a process illustrated in Scheme 3.

Scheme 3

RCOCl + R'NHNH$_2$ ⟶ RCONHNHR' $\xrightarrow{PCl_5}$
RCCl=NNHR' $\xrightarrow{Base}$ RCNNR'

The reaction with rubber gives the structure of the attachment shown below.

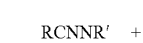
RCNNR' +

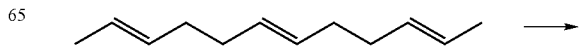

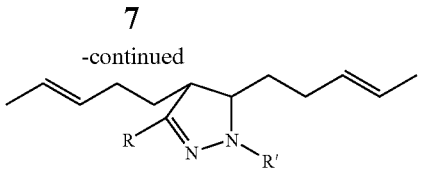

The intermediate acid chlorides from IIB, i.e., a thionyl chloride reaction with triethoxysilylpropyl maleamic acid, can be reacted with methyl hydrazine, followed by chlorination and dehydrohalogenation with a base, to give the nitrile imine. As discussed above, the reactivity of the product can be modified by the type of R' used and the coupling can be moderated as mentioned in IA above, and the trialkoxysilane can be introduced by the reaction of, for example, ethyl carbazate with a trialkoxysilane, as described above.

C. Nitrile Oxide

This type of dipolar compound can readily be synthesized from aldehydes in the following manner, similar to the nitrones depicted above. However, this scheme requires additional steps of chlorination and dehydrohalogenation to obtain the desired triethoxysilane product.

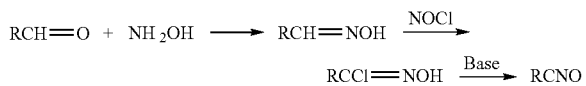

The reaction of this compound with unsaturated rubber gives the following product.

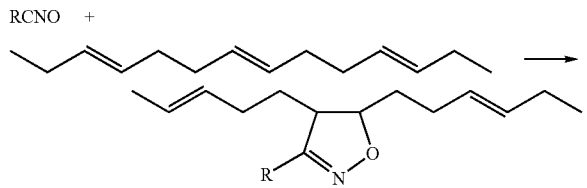

Trialkoxysilane group(s) can be added, as described above and in example 3, below.

In contrast to the teachings of U.S. Pat. Nos. 7,238,740 and 6,878,768, and according to arrangements of the present invention, it was unexpectedly discovered that the detrimental effects of rapid diene rubber binding by eneophiles such as, but not limited to, maleimide alkoxysilanes, citronimide alkoxysilanes and azo-bis-carbonyl alkoxysilanes, and alkoxysilane compounds that bind to the rubber by 1,3 dipolar addition, can be overcome by using very small amounts of these silica/rubber coupling agents in combination with an additional silica shielding agent that shields other silica present in the composition but does not bind to the rubber. That is, the eneophilic alkoxysilanes and those alkoxysilanes having groups that bind to the rubber by 1,3 dipolar addition, facilitate binding of silica by the polymer, and the silica shielding agent provides a desirable compound viscosity for processability. Thus the appropriate combination of the silica/rubber coupling agent and the silica shielding agent results in a vulcanizable and/or vulcanized elastomeric composition, containing virtually any olefin rubber or combination of olefin rubbers, that demonstrates tensile mechanical and dynamic viscoelastic properties that are improved over similar compounds prepared with either the maleimide alkoxysilane or the citraconimide alkoxysilane alone (isoprene excepted). Further, the properties of the invention compounds exhibit improved dispersion of silica, reduced filler flocculation after compounding and increased bound rubber content, resulting in lower hysteresis and improved wear resistance in the vulcanized product, comparable to or improved over compounds containing a bis(trialkoxysilylorgano) polysulfide. Silica-reinforced rubber stocks containing small amounts of sulfur-containing mercaptosilane coupling agents and larger amounts of alkyl alkoxysilanes are described in our U.S. Pat. No. 6,433,065. However, it was unexpected to discover that the present stocks containing a combination of small amounts of non sulfur-containing silica coupling agents and large amounts of alkyl alkoxysilanes also provided desirable rubber properties.

The weight ratio of the coupling agent to the alkyl alkoxysilane can be about 0.0001:1 to about 1:1, especially about 0.001:1 to about 0.80:1, also about 0.002:1 to about 0.60:1 and about 0.005:1 to about 0.40:1, or about 0.01:1 to about 0.20:1. The coupling agent is present in an amount of about 0.0001% to about 3% by weight, based on the weight of the silica, or about 0.001% to about 1.5% by weight or about 0.01% to about 1% by weight, based on the weight of the silica. The alkyl alkoxysilane can also be present in an amount of about 0.1% to about 20% by weight, based on the weight of the silica. Usually, the alkyl alkoxysilane is present in an amount of about 1% to about 15% by weight and, often, in an amount of about 1% to about 10% by weight, based on the weight of the silica.

Alkoxysilanes suitable for use in the invention compounds have the formula $R^1_p Si(OR^2)_{4-p}$, wherein the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$ aliphatic, and p is an integer from 1 to 3. In another arrangement, at least one $R^1$ contains from 6 to 20 carbon atoms and the remainder of the $R^1$ groups, if any, contain from 1 to 3 carbon atoms. The $R^2$ can contain 1 to 4, more preferably 1 or 2, carbon atoms. In some arrangements, $R^2$ is an alkyl group. Suitably, at least one $R^1$ is much larger in terms of carbon atoms than an $R^2$ contained in the alkoxy groups of the silane.

Typically, the alkyl alkoxysilane is a trialkoxysilane such as, but not limited to, octyltriethoxysilane, octyltrimethoxysilane, trimethylethoxysilane, cyclohexyltriethoxysilane, isobutyltriethoxysilane, ethyltrimethoxysilane, cyclohexyltributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyltrimethoxysilane, methyloctyldimethoxysilane, mixtures of these, and the like. Often the alkyl alkoxysilane is selected from at least one of n-octyltriethoxysilane, n-hexadecyltriethoxysilane, n-octadecyltriethoxysilane, methyl n-octyldiethoxysilane, and the like. In a more suitable embodiment, the alkyl alkoxysilane comprises n-octyltriethoxysilane.

Although alkyl alkoxysilanes employing methoxysilane groups can be used, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

The elastomers containing unsaturated carbon-carbon bonds in the molecular structure are those that are typically employed within vulcanizable compositions that are useful for making tires and tire components and include both natural and synthetic elastomers. As used herein, the term elastomer or rubber will refer to a blend of synthetic and natural rubber, a blend of various synthetic rubbers, or simply one type of elastomer or rubber. When the preferred polymers are blended with conventional rubbers, the amounts can vary widely within a range comprising from about one to about 100 percent by weight of the total rubber, with the conventional rubber or rubbers making up the balance of the total rubber (100 parts).

As discussed further below, the elastomer is preferably selected from the group consisting of homopolymers of conjugated diene monomers, and copolymers and terpolymers of the conjugated diene monomers with monovinyl aromatic monomers and trienes. For example, suitable elastomers include, but are not limited to, natural rubber, polyisoprene, styrene/butadiene rubber, polybutadiene, butadiene copolymers and terpolymers comprising greater than about 35% butadiene by weight, butyl rubber, neoprene, ethylene/propylene diene rubber, acrylonitrile/butadiene rubber (NBR), and mixtures and blends thereof. In many cases butadiene/isoprene copolymer, butadiene/isoprene/styrene terpolymer, and styrene/butadiene copolymer can be used.

The diene elastomers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about 10 percent to 20 percent by weight of the total rubber. The minimum amount will depend primarily upon the physical properties desired.

The vulcanizable rubber compositions according to the invention can comprise any solution polymerizable or emulsion polymerizable elastomer. Solution and emulsion polymerization techniques are well known to those of ordinary skill in the art. The elastomers that are useful in practicing this invention can also include any of the various functionalized polymers that are conventionally employed in the art of making tires. For example, polymers can be terminally functionalized, or functionalized throughout the polymer backbone, such as with functional groups derived from an anionic polymerization initiator or a terminating or coupling agent. Preparation of functionalized polymers is well known to those skilled in the art. Exemplary methods and agents for functionalization of polymers are disclosed, for example, in U.S. Pat. Nos. 5,268,439, 5,496,940, 5,521,309 and 5,066,729, the disclosures of which are hereby incorporated by reference. For example, compounds that provide terminal functionality that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidononones, tin tetrachloride, tributyl tin chloride, carbon dioxide, and mixtures thereof. Other useful terminating agents can include those of the structural formula $(R)_a ZX_b$, where Z is tin or silicon, R is an alkyl having from about one to about 20 carbon atoms, a cycloalkyl having from about 3 to about 30 carbon atoms; and aryl having from about 6 to about 20 carbon atoms, or an aralkyl having from about 7 to about 20 carbon atoms. For example, R can include methyl, ethyl, n-butyl, neophyl, phenyl, cyclohexyl, or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to polymers terminated with these agents, since other compounds that are reactive with the polymer bound carbon-lithium moiety can be selected to provide a desired functional group.

The elastomeric compound can be sulfur vulcanized and prepared by the steps of (a) mixing together at a temperature of about 130° C. to about 200° C. in the absence of added sulfur and cure agents, an elastomer optionally having an alkoxysilane terminal group and containing unsaturated carbon-carbon bonds in its molecular structure, a reinforcing inorganic filler, carbon black, or a mixture of the inorganic filler with carbon black, an alkyl alkoxysilane, and a non-sulfur coupling agent, as described above, wherein the ratio of the coupling agent to the alkyl alkoxysilane is about 0.0001:1 to about 1:1; (b) allowing the mixture to cool below the mixing temperature; (c) mixing the mixture obtained in step (b), at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes.

Depending on the compound desired, the initial step of the method often requires that the mixture reaches a temperature from about 130° C. to about 200° C., about 155° C. to about 200° C., about 165° C. to about 195° C., more often about 170° C. to about 190° C., especially about 170° C. to about 185° C. In one arrangement of the invention, the initial mixing step can include at least two substeps. That is, the initial mixing step can comprise a first substep (i) mixing together the elastomer, at least a portion of the inorganic reinforcing filler, at least a portion of alkyl alkoxysilane and at least a portion of the coupling agent, with an optional intervening cooling step; and a second substep (ii) mixing the mixture obtained in step (i) with the remainder of the inorganic reinforcing filler, if any, and the remainder of the alkyl alkoxysilane and/or coupling agent if any. The method can further include a remill step in which either no ingredients are added to the first mixture, or non-curing ingredients are added, in order to reduce the compound viscosity and improve the dispersion of the inorganic reinforcing filler. The temperature of the remill step is typically about 130° C. to about 175° C., especially about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C.

and is typically about 40° C. to about 115° C., about 60° C. to about 110° C. and, especially, about 75° C. to about 100° C.

The order of addition of the reinforcing filler, alkyl alkoxysilane and coupling agent to the mixer in the initial step of the method is not critical. The alkyl alkoxysilane and/or the mercaptosilane can be added prior to or after the addition of the filler. In one arrangement of the method, a portion of the reinforcing filler and the coupling agent and/or the alkyl alkoxysilane are added simultaneously to the mixer. For example, the coupling agent and/or the alkyl alkoxysilane can be partially or fully supported on the inorganic reinforcing filler and/or the carbon black reinforcing filler. The ratio of the amount of supported silane to the filler is not critical. If the silane is a liquid, a suitable ratio of supported silane to filler is that which results in a suitably dry material for addition to the elastomer. For example, the ratio can be about 1/99 to about 70/30, about 20/80, about 60/40, about 50/50, and the like.

Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The vulcanizable rubber compositions of the invention are preferably compounded with inorganic reinforcing fillers, such as silica or carbon black, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 150 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J. M. Huber Corporation.

The elastomers can be compounded with all forms of carbon black alone, or in a mixture with the silica. The carbon black can be present in amounts ranging from about one to about 90 phr, with about five to about 60 phr being preferred. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550 and N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

The vulcanizable rubber compositions of the invention can optionally further include an additional silica coupling agent such as, but not limited to, mercaptosilane(s), blocked mercaptosilane(s), bis(trialkoxysilylorgano)polysulfide(s), 3-thiocyanatopropyl trimethoxysilane, silanes that are carried on a filler such as silica, carbon black and the like, or any of the silica coupling agents that are known to those of ordinary skill in the rubber compounding art. Exemplary mercaptosilanes include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and the like. The mercaptosilane can be present in the compound in an amount of about 0.0001% to about 3% by weight, typically about 0.001% to about 1.5% by weight, and especially about 0.01% to about 1% by weight, based on the weight of the silica. Exemplary blocked mercaptosilanes include, but are not limited to, octanoyl blocked 3-mercaptopropyltriethoxysilane, and the like.

Exemplary bis(trialkoxysilylorgano)polysulfide silica coupling agents include, but are not limited to, bis(3-triethoxysilyl-propyl)tetrasulfide (TESPT), which is sold commercially under the tradename Si69 by Degussa Inc., New York, N.Y., and bis(3-triethoxysilylpropyl) disulfide (TESPD) or Si75, available from Degussa, or Silquest® A1589, available from Crompton. The polysulfide organosilane silica coupling agent can be present in an amount of about 0.01% to about 20% by weight, based on the weight of the silica, preferably about 0.1% to about 15% by weight, and especially about 1% to about 10%.

Exemplary additional silica shielding agents suitable for use in the invention include, but are not limited to an alkyl alkoxysilane, an alkoxy-modified silsesquioxane (AMS) an mercaptan/alkoxy-modified co-AMS, an amino AMS, an amino/mercaptan co-AMS, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof or a mineral or non-mineral additional filler, as described in greater detail below. Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these additional silica dispersing aids when used with the bis(trialkoxysilylorgano) polysulfide silica coupling agents is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the fatty acid ester based on the weight of the silica. Esters of polyols, including glycols such as polyhydroxy compounds and the like, polyethylene oxides, polyethers, and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred.

The silica coupling agents, silica shielding agents and/or other silica dispersing aids and/or other liquid components of the composition can be fully or partially supported by the reinforcing filler. The ratio of the component to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the strong organic base catalysts, as well as any of the silica dispersing aids, and silica coupling agents described above. As with the support of the silica dispersing aid on the reinforcing filler, as described above, the ratio of dispersing aid to non-reinforcing filler is not critical. For example, the ratio can be about 1/99 to about 70/30, about 20/80, about 60/40, about 50/50, and the like, by weight.

The vulcanizable rubber compositions are compounded or blended by using mixing equipment and procedures conventionally employed in the art, such as mixing the various vulcanizable polymer(s) with reinforcing fillers and commonly used additive materials such as, but not limited to, curing agents, activators, retarders and accelerators; processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

The vulcanizable rubber composition can then be processed according to ordinary tire manufacturing techniques Likewise, the tires are ultimately fabricated by using standard rubber curing techniques. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such subtreads, sidewalls, body ply skims, bead fillers, apex, chafer, sidewall insert, wirecoat, inner liner, and the like.

EXAMPLES

The following examples are prophetic and illustrate methods of preparation of representative non-sulfur coupling agents, in combination with an alkyl alkoxysilane (n-octyltriethoxysilane), inorganic reinforcing fillers (silica in combination with carbon black), and rubber compounds and tire components containing them. However, the examples are not intended to be limiting, as other similar coupling agents can be prepared according to the described methods and other ratios of the coupling agent to the alkyl alkoxysilane can be used, as well as other inorganic reinforcing fillers. Moreover, the methods are exemplary only and other methods for preparing the coupling agents and other rubber compounds, including different compounding formulations and reinforcing fillers, can be determined by those skilled in the art without departing from the scope of the invention herein disclosed and claimed.

Example 1

Preparation of a Maleimide Triethoxysilane Coupling Agent

N-(3-propyl triethoxysilyl) maleimide (PSM) is prepared by the addition of 100 mL of a 2.33 molar saturated anhydrous toluene solution of maleic anhydride (22.85 g of anhydride, 0.233 mol) to a one liter flask containing 100 mL of dry toluene and then, under nitrogen, slowly dripping in a solution of 3-aminopropyl triethoxysilane (51.6 g, 54.8 mL, 0.233 mol) dissolved in 100 mL of dry toluene over a 15 minute period. After stirring 2 hours, anhydrous zinc chloride (10 g, 73.3 mmol) and hexamethyldisilazane (HMDS) (47.0 g, 60.7 mL, 0.291 mol) dissolved in 100 mL of dry toluene are added. The solution is heated to 80° C. for 18 hrs with stifling before being filtered and isolated by distillation.

Example 2

Preparation of Azo-Bis-Carbonyl Triethoxysilane Coupling Agents

An N-(3-propyl triethoxysilyl) (NPTS) group can be added to a variety of azo-bis-carbonyl compounds to prepare eneophiles that will readily react with double bonds in a diene rubber.

(A) Reaction of Ethyl Carbazate (EC) with Isocyanates

To a solution of ethyl carbazate (20.8 g, 0.2 mol) in 200 mL of dry tetrahydrofuran (THF) is added a solution of 3-isocyanatopropyl triethoxysilane (49.5 g, 50 mL, 0.2 mol, available from Gelest) in 50 mL of dry THF. The solvent is removed by heating with vacuum or a nitrogen purge to give an intermediate that is then suspended in 500 mL of dry methylene chloride with anhydrous sodium sulfate (35.5 g, 0.25 mol) added as a drying agent. Into this slurry is slowly bubbled dinitrogen tetroxide until brown vapor of the unreacted gas persists above the solution. Filtration and removal of the solvent allows the isolation of the solid product coupling agent.

(B) Reaction of Ethyl Carbazate (EC) with Chloroformates

The chloroformate of the 4-hydroxybutyramide of NPTS is prepared by the diluting 100 mL of an approximate 20% toluene solution of phosgene (19.8 g, 0.2 mol) to a total of 200 mL with more dry toluene. This solution is then added to a solution of N-(3-triethoxysilyl propyl)-4-hydroxybutyramide (61.5 g, 60.3 mL, 0.2 mol, Gelest) and dimethyl aniline (24.2 g, 0.2 mol) dissolved in 200 mL of THF. After heating 3 hrs at 80° C. the solution is cooled, filtered free of the dimethyl aniline hydrochloride and concentrated. The chloroformate obtained is reacted in 200 mL of THF containing the EC (20.8 g, 0.2 mol) and triethylamine (20.2 g, 27.9 mL, 0.2 mol) by heating for 3 hrs at reflux, cooling and filtering. Then, oxidization in methylene chloride as described above in (A) gives the desired coupling agent.

(C) Reaction of Ethyl Carbazate (EC) with Acid Chlorides

The acid chloride of triethoxy propyl maleamic acid (63.9 g, 0.2 mol) (available from Gelest) was prepared in 300 mL of THF by addition of thionyl chloride (23.8 g, 14.5 mL, 0.2 mol) and heating to reflux for 1 hrs. The solution was cooled, reacted with EC as above in (B) to obtain the desired coupling agent.

Example 3

Preparation of a Nitrone Coupling Agents By 1,3 Dipolar Addition

A solution of triethoxysilyl undecanal (66.5 g, 0.2 mol, available from Gelest) in 250 mL of absolute ethanol is added to phenyl hydroxylamine hydrochloride (29.1 g, 0.2 mol) and triethylamine (30.3 g, 41.9 mL, 0.3 mol) and allowed to stand at ambient temperature for 20 hrs. The ethanol and excess amine are removed by heat and vacuum. The desired nitrone product is readily separated from the residue by washing it free of the amine hydrochloride with methylene chloride.

Example 4

Evaluation of the Prepared Coupling Agents in a Diene Rubber Composition

The silica/rubber coupling agents prepared in Examples 1 through 3 are evaluated in a rubber composition illustrated in Table 1. The rubber stocks are prepared with various amounts of the coupling agents and the alkyl alkoxysilane, and the control stock is prepared with the 3-mercaptopropyltriethoxysilane and the alkyl alkoxysilane. The control stock was described in our U.S. Pat. No. 6,433,065, and was shown to provide desirable processability and improved tensile mechanical and dynamic viscoelastic properties. The silica/rubber coupling agent is added in the master batch stage; although it could be added in the remill stage or any other stage prior to the final stage. All of the charges are listed as parts per hundred rubber (phr). The drop temperatures of the mixing steps are as follows: master batch, 154° C.; remill, 143° C.; and final, 105° C. All of the compounded final stocks are sheeted and subsequently cured at 171° C. for 15 minutes.

Example 5

A. Processing Evaluation of Rubber Compound

The processing of the green stocks (i.e., the stock obtained after the final stage, prior to curing) is characterized as to Mooney viscosity and cure characteristics. The Mooney viscosity measurement is conducted at 130° C. using a large rotor. The Mooney viscosity is recorded as the torque when the rotor is rotated for 4 minutes. The samples are preheated at 130° C. for one minute before the rotor is started. A Monsanto Rheometer MD2000 is used to characterize the stock curing process. The frequency is 1.67 Hz and the strain is 7% at 160° C. The $T_{s2}$ and $T_{90}$ are obtained from these measurements and represent the time when the torque rises to 2% and 90%, respectively, of the total torque increase during the curing process. These measurements are used to predict how quickly the viscosity built up ($Ts_2$) and the curing rate (T90) during the curing process.

The $ML_4$ of the compounded stock at 130° C. increases as the amount of alkyl alkoxysilane increases with respect to the amount of the coupling agent in the composition. That is, the viscosity decreases as the ratio of coupling agent to alkyl alkoxysilane decreases.

B. Tire Performance Predicted Based on the Measured Dynamic Viscoelastic Mechanical Properties The dynamic viscoelastic properties for the stocks are obtained from temperature sweep tests conducted with a frequency of 31.4 rad/sec using 0.5% strain for temperatures ranging from −100° C. to −20° C., and 2% strain for temperatures ranging from −20° C. to 100° C. The stocks containing the indicated ratio of coupling agent and alkyl alkoxysilane have a value of 50° C. tan δ, and stress and strain properties similar to the control stock containing a mercaptosilane and alkyl alkoxysilane in a similar ratio.

These favorable properties of the non-sulfur coupling agent and alkyl alkoxysilane combination-containing stock are confirmed by measuring the dynamic viscoelastic properties using the dynamic compression test and rebound tests. The sample geometry used for the dynamic compression test is a cylindrical button having a diameter of 9.5 mm and a length of 15.6 mm. The sample is compressed under a static load of 2 kg before testing. After an equilibrium state is reached, the test was started with a dynamic compression load of 1.25 kg at a frequency of 1 Hz. The sample is dynamically compressed and then extended, and the resultant displacement K', the dynamic storage compression modulus K" and the hysteresis (tan δ) were then recorded, as well as the resilience of the rubber compound (rebound test).

The Zwick rebound resilience tester measures rebound resilience as a very basic dynamic test. The test piece is subjected to one-half cycle of deformation. The sample geometry is round with a diameter of 38.1 mm and a thickness of 1.9 mm. The specimen is strained by impacting the test piece with an indentor which is free to rebound after the impact. The rebound resilience is defined as the ratio of mechanical energies before and after impact. Samples are preheated 30 minutes prior to testing.

TABLE 1

Rubber Formulation

| Ingredient | Amount (phr) |
| --- | --- |
| Styrene-butadiene rubber* | 100 |
| Carbon black | 35 |
| Silica | 30 |
| Silica/Rubber Coupling Agent** | Varied |
| Alkyl alkoxysilane (OTES)† | Varied |
| 3-mercaptopropyltriethoxysilane | Varied |
| Antioxidant - 6PPD | 0.95 |
| Naphthenic oil | 12.5 |
| Wax | 1.0 |
| Zinc oxide | 2.5 |
| Sulfur | 2 |
| CBS†† | 1.5 |
| DPG†† | 0.8 |

*SBR -- 23.5% styrene, $T_g$ = −36° C., $ML_4$ = 58
**An invention coupling agent prepared as in examples 1-3 or a control 3- mercaptopropyl triethoxysilane carried on silica (Ciptane ® 255LD from PPG Industries).
†OTES = n-octyltriethoxysilane
††CBS = N-cyclohexyl-2-benzothiazolesulfenamide; DPG = diphenyl guanidine While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A vulcanizable rubber composition comprising:
   (a) an elastomer containing unsaturated carbon-carbon bonds in its molecular structure;
   (b) a reinforcing inorganic filler, carbon black, or a mixture of the inorganic filler with carbon black;
   (c) a coupling agent comprising an alkoxysilane moiety that binds to the inorganic filler and a non-sulfur moiety that reacts with the unsaturated carbon-carbon bonds of the elastomer to bind the coupling agent to the elastomer;
   (d) an alkyl alkoxysilane, wherein the weight ratio of the coupling agent to the alkyl alkoxysilane is about 0.0001:1 to about 1:1; and
   (e) a cure agent;
   wherein the non-sulfur moiety that reacts with the unsaturated carbon-carbon bonds of the elastomer to bind the coupling agent to the elastomer is:
   (i) —N(C═O)$_2$N═N,
   (ii) —N(C═O)$_2$CH═CR$^1$,
   (iii) —NH(C═O)N═N(C═O)OR$^1$,
   (iv) —(C═O)N═N(C═O)OR$^1$; and
   (v) —O(C═O)N═N(C═O)OR$^1$; and mixtures thereof;
   wherein R$^1$ is C$_1$ to C$_4$ alkyl.

2. The rubber composition of claim 1, wherein the weight ratio of the coupling agent to the alkyl alkoxysilane is about 0.001:1 to about 0.80:1.

3. The rubber composition of claim 1, wherein the coupling agent is present in an amount of about 0.0001% to about 3% by weight, based on the weight of the silica.

4. The rubber composition of claim 3, wherein the alkyl alkoxysilane is present in an amount of about 0.1% to about 20% by weight, based on the silica.

5. The rubber composition of claim 1, wherein the non-sulfur moiety of the coupling agent consists essentially of an eneophile.

6. The rubber composition of claim 5, wherein the coupling agent comprises an imidoalkoxysilane, an azo-bis-carbonylalkoxysilane, or mixtures thereof.

7. The rubber composition of claim 1, wherein the inorganic filler is selected from the group consisting of silicates, talc, kaolin, clay, metal oxides, aluminum hydrate, mica, and mixtures thereof.

8. The rubber composition of claim 1, wherein the elastomer is selected from the group consisting of homopolymers of a conjugated diene monomer, and copolymers and terpolymers of the conjugated diene monomers with monovinyl aromatic monomers and trienes.

9. The rubber composition of claim 8, wherein the elastomer is selected from the group consisting of natural rubber, polyisoprene, styrene/butadiene rubber, polybutadiene, butadiene copolymers and terpolymers comprising greater than about 35% butadiene by weight, butyl rubber, neoprene, ethylene/propylene diene rubber, acrylonitrile/butadiene rubber, and mixtures and blends thereof.

10. The rubber composition of claim 9, wherein the elastomer is selected from the group consisting of butadiene/isoprene copolymer, butadiene/isoprene/styrene terpolymer, and styrene/butadiene copolymer.

11. The rubber composition of claim 1, wherein the alkyl alkoxysilane compound has the formula R$^1_p$Si(OR$^2$)$_{4-p}$, wherein the alkoxy groups are the same or different from each other, each R$^1$ independently comprises C$_1$ to about C$_{20}$ aliphatic, about C$_5$ to about C$_{20}$ cycloaliphatic, or about C$_6$ to about C$_{20}$ aromatic, each R$^2$ independently comprises C$_1$ to about C$_6$ aliphatic, and p is an integer from 1 to 3.

12. The rubber composition of claim 11, wherein the alkyl alkoxysilane is selected from the group consisting of octyltriethoxysilane, octyltrimethoxysilane, trimethylethoxysilane, cyclohexyltriethoxysilane, isobutyltriethoxysilane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxy-silane, dodecyltriethoxysilane, tetradecyltriethoxysilane, octadecyltri-ethoxysilane, methyloctyl-diethoxysilane, dimethyldimethoxysilane, methyltri-methoxysilane, propyltrimethoxy-silane, hexyltrimethoxysilane, heptyltrimethoxy-silane, nonyltrimethoxysilane, decyltrimethoxysilane, dodecyltrimethoxysilane, tetradecyltrimethoxysilane, octadecyltrimethoxysilane, methyloctyl dimethoxysilane, and mixtures thereof.

13. The rubber composition of claim 12, wherein the alkyl alkoxysilane comprises n-octyltriethoxysilane.

14. The rubber composition of claim 1, further comprising an additional shielding agent for the inorganic filler.

15. The rubber composition of claim 14 wherein the additional shielding agent is selected from the group consisting of an additional alkyl alkoxysilane, an alkoxy-modified silsesquioxane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, an ester of a polyol, a polyethylene oxide, a polyether, and mixtures thereof.

16. The rubber composition of claim 15, wherein the fatty acid ester is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

17. A vulcanized rubber compound comprising the vulcanizable rubber composition of claim 1.

18. A pneumatic tire comprising a component produced from a vulcanized rubber composition comprising an elastomer containing unsaturated carbon-carbon bonds in its molecular structure;
a reinforcing inorganic filler, carbon black, or a mixture of the inorganic filler with carbon black;
a coupling agent comprising an alkoxysilane moiety that binds to the inorganic filler and a non-sulfur moiety that reacts with the unsaturated carbon-carbon bonds of the elastomer to bind the coupling agent to the elastomer;
an alkyl alkoxysilane, wherein the weight ratio of the coupling agent to the alkyl alkoxysilane is about 0.0001:1 to about 1:1; and
a cure agent;
wherein the non-sulfur moiety that reacts with the unsaturated carbon-carbon bonds of the elastomer to bind the coupling agent to the elastomer is:
(i) —N(C═O)₂N═N,
(ii) —N(C═O)₂CH═CR¹,
(iii) —NH(C═O)N═N(C═O)OR¹,
(iv) —(C═O)N═N(C═O)OR¹;
(v) —O(C═O)N═N(C═O)OR¹; and mixtures thereof;
wherein R¹ is $C_1$ to $C_4$ alkyl.

19. The pneumatic tire of claim 18, wherein the component is selected from the group consisting of treads, subtreads, sidewalls, body ply skims, bead fillers, apex, chafer, sidewall insert, wirecoat, inner liner, and combinations thereof.

20. A vulcanizable rubber composition comprising:
(a) an elastomer containing unsaturated carbon-carbon bonds in its molecular structure;
(b) a reinforcing inorganic filler, carbon black, or a mixture of the inorganic filler with carbon black;
(c) a coupling agent comprising an alkoxysilane moiety that binds to the inorganic filler and a non-sulfur moiety that reacts with the unsaturated carbon-carbon bonds of the elastomer to bind the coupling agent to the elastomer;
(d) an alkyl alkoxysilane, wherein the weight ratio of the coupling agent to the alkyl alkoxysilane is about 0.20:1 to about 1:1; and
(e) a cure agent.

21. The rubber composition of claim 1, wherein the coupling agent comprises the formula:

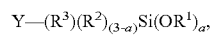

wherein R¹ is $C_1$ to $C_4$ alkyl; R² is $C_1$ to $C_{20}$ alkyl, $C_3$ to $C_{20}$ cycloalkyl, $C_6$ to $C_{20}$ aromatic or $C_5$ to $C_{20}$ heteroaromatic; R³ is $C_1$ to $C_{20}$ alkylenyl, $C_3$ to $C_{20}$ cycloalkylenyl, $C_6$ to $C_{20}$ arylenyl, $C_5$ to $C_{20}$ heteroarylenyl, or R⁴—CH═CH—R⁴, where R⁴ is a single bond or an R³; a=1, 2 or 3; and Y is the non-sulfur moiety.

* * * * *